(12) United States Patent
Usuda

(10) Patent No.: US 10,732,670 B2
(45) Date of Patent: Aug. 4, 2020

(54) REAL-TIME CLOCK MODULE, ELECTRONIC DEVICE, VEHICLE, AND INFORMATION PROCESSING SYSTEM

(71) Applicant: Seiko Epson Corporation, Tokyo (JP)

(72) Inventor: Toshiya Usuda, Ina (JP)

(73) Assignee: Seiko Epson Corporation (JP)

( * ) Notice: Subject to any disclaimer, the term of this patent is extended or adjusted under 35 U.S.C. 154(b) by 226 days.

(21) Appl. No.: 16/011,713

(22) Filed: Jun. 19, 2018

(65) Prior Publication Data

US 2018/0364753 A1 Dec. 20, 2018

(30) Foreign Application Priority Data

Jun. 20, 2017 (JP) ................................ 2017-120381

(51) Int. Cl.
  *G06F 1/14* (2006.01)
  *G07C 5/08* (2006.01)
  *G07C 5/10* (2006.01)
  *G06F 1/10* (2006.01)
  *B60W 20/00* (2016.01)

(52) U.S. Cl.
  CPC .............. *G06F 1/14* (2013.01); *B60W 20/00* (2013.01); *G06F 1/10* (2013.01); *G07C 5/085* (2013.01); *G07C 5/10* (2013.01)

(58) Field of Classification Search
  CPC . G06F 1/14; G06F 1/10; B60W 20/00; G07C 5/085; G07C 5/10
  See application file for complete search history.

(56) References Cited

U.S. PATENT DOCUMENTS

| 6,505,304 | B1* | 1/2003 | Ozawa | G06F 1/14 |
| | | | | 710/61 |
| 6,971,038 | B2* | 11/2005 | Santhanam | G06F 1/08 |
| | | | | 712/220 |
| 9,292,036 | B2* | 3/2016 | Grocutt | G06F 1/12 |
| 9,450,569 | B1* | 9/2016 | Ansari | G06F 1/14 |
| 2003/0099319 | A1* | 5/2003 | Bailey | H03K 5/131 |
| | | | | 375/376 |
| 2004/0205368 | A1* | 10/2004 | Lange-Pearson | G06F 1/12 |
| | | | | 713/400 |
| 2009/0237244 | A1* | 9/2009 | Fujimaki | G06F 1/14 |
| | | | | 340/540 |
| 2013/0050308 | A1* | 2/2013 | Asauchi | B41J 2/17513 |
| | | | | 347/6 |

(Continued)

FOREIGN PATENT DOCUMENTS

JP  2007-064867 A  3/2007

*Primary Examiner* — Aurel Prifti

(74) *Attorney, Agent, or Firm* — Harness, Dickey & Pierce, P.L.C.

(57) ABSTRACT

A real-time clock module includes a clocking circuit configured to generate clocking data based on a clock signal, an output terminal, a memory circuit configured to store output control information for controlling an output of a signal from the output terminal and output value information in which a value of the signal output from the output terminal is set, and an interface circuit configured to receive a setting value of the output control information and a setting value of the output value information. When the setting value of the output control information is a first setting value, the real-time clock module outputs a first signal based on the setting value of the output value information from the output terminal.

11 Claims, 9 Drawing Sheets

(56) References Cited

U.S. PATENT DOCUMENTS

| | | | | |
|---|---|---|---|---|
| 2014/0245058 A1* | 8/2014 | Bowman | ............... | G06F 1/12 |
| | | | | 713/400 |
| 2015/0028676 A1* | 1/2015 | Kiya | ............... | H02J 9/061 |
| | | | | 307/52 |
| 2015/0116015 A1* | 4/2015 | Toriumi | ............... | G06F 1/10 |
| | | | | 327/147 |
| 2016/0255248 A1* | 9/2016 | Kobayashi | ............... | H04N 5/3765 |
| | | | | 348/518 |
| 2016/0261251 A1* | 9/2016 | Tidwell | ............... | G06F 1/06 |
| 2017/0153661 A1* | 6/2017 | Kamiyama | ............... | G06F 1/12 |
| 2017/0307762 A1* | 10/2017 | Nakajima | ............... | G01S 19/235 |

* cited by examiner

| bit 7 | bit 6 | bit 5 | bit 4 | bit 3 | bit 2 | bit 1 | bit 0 |
|---|---|---|---|---|---|---|---|
| DCE | DC | – | – | SRV | FS2 | FS1 | FS0 |

| DCE | DC | OPERATION |
|---|---|---|
| 0 | 0 | SOUT OUTPUT CORRESPONDING TO SETTING OF SRV AND FS2 TO FS0 |
| 0 | 1 | |
| 1 | 0 | SOUT OUTPUT = Low |
| 1 | 1 | SOUT OUTPUT = High |

| SRV | OPERATION |
|---|---|
| 0 | NONINVERSION |
| 1 | INVERSION |

| FS2 | FS1 | FS0 | FLAG TO BE SELECTED |
|---|---|---|---|
| 0 | 0 | 0 | TF |
| 0 | 0 | 1 | AF |
| 0 | 1 | 0 | UF |
| 0 | 1 | 1 | EVF |
| 1 | 0 | 0 | VDET |
| 1 | 0 | 1 | VLF |
| 1 | 1 | 0 | NONE (OUTPUT Low) |
| 1 | 1 | 1 | |

FIG. 2

REAL-TIME CLOCK MODULE, ELECTRONIC DEVICE, VEHICLE, AND INFORMATION PROCESSING SYSTEM

BACKGROUND

1. Technical Field

The present invention relates to a real-time clock module, an electronic device, a vehicle, and an information processing system.

2. Related Art

JP-A-2007-64867 (Patent Literature 1) discloses a real-time clock device including an oscillation circuit section configured to output a clock signal having a predetermined frequency, a divider circuit section configured to divide a clock signal output by the oscillation circuit section into a plurality of stages and output a signal for clock, a clock/calendar circuit section rewritably formed and configured to count the signal for clock output by the divider circuit section and output a signal of a present date and time, and a date-and-time-data-abnormality detecting section configured to detect an abnormality of date and time data input to the clock/calendar circuit section and output an abnormal data detection signal.

In an electronic device or a system mounted with a real-time clock module (a real-time clock device), a control device (an MPU) sometimes controls other devices via general-purpose input/output (GPIO) terminals. However, when an electronic device or a system in which a control device needs to control a large number of devices is assumed, it is likely that the number of usable general-purpose input/output terminals is insufficient.

SUMMARY

According to several aspects of the invention, it is possible to provide a real-time clock module usable for control of devices. According to several aspects of the invention, it is possible to provide an electronic device, a vehicle, and an information processing system including the real-time clock module.

The invention can be realized as the following aspects or application examples.

Application Example 1

A real-time clock module according to this application example includes: a clocking circuit configured to generate clocking data based on a clock signal; an output terminal; a memory circuit configured to store output control information for controlling an output of a signal from the output terminal and output value information in which a value of the signal output from the output terminal is set; and an interface circuit configured to receive a setting value of the output control information and a setting value of the output value information. When the setting value of the output control information is a first setting value, the real-time clock module outputs a first signal based on the setting value of the output value information from the output terminal.

The real-time clock module according to this application example receives the setting value of the output control information and the setting value of the output value information via the interface circuit and, when the setting value of the output control information is the first setting value, outputs the first signal based on the setting value of the output value information from the output terminal. Therefore, an external device can freely control a value of the first signal output from the output terminal by setting the setting value of the output control information to the first setting value and setting the output value information to a desired setting value in the real-time clock module according to this application example via the interface circuit. Therefore, the external device can perform control of other devices connected to the output terminal. In this way, the real-time clock module according to this application example is usable for the control of the devices.

Application Example 2

In the real-time clock module according to the application example, the memory circuit may further store flag information indicating an operation state of the real-time clock module, and, when the setting value of the output control information is a second setting value, the real-time clock module may output a second signal based on the flag information from the output terminal.

The real-time clock module according to this application example receives the setting value of the output control information and the setting value of the output value information via the interface circuit and, when the setting value of the output control information is the second setting value, outputs the second signal based on the flag information indicating the operation state of the real-time clock module from the output terminal. Therefore, the external device can recognize the operation state of the real-time clock module based on the second signal output from the output terminal by setting the setting value of the output control information to the second setting value in the real-time clock module according to this application example via the interface circuit.

Application Example 3

In the real-time clock module according to the application example, the memory circuit may further store output logic selection information for selecting whether the second signal is in a high level or a low level when the flag information has a predetermined value, and the interface circuit may receive a setting value of the output logic selection information.

With the real-time clock module according to this application example, it is possible to select a relation between a value of the flag information and a polarity of the second signal according to specifications of a device to which the second signal is supplied.

Application Example 4

The real-time clock module according to the application example may further include a logic inversion selection circuit configured to select based on the setting value of the output logic selection information whether a value of the flag information is logically inverted.

With the real-time clock module according to this application example, it is possible to select the relation between the value of the flag information and the polarity of the second signal with simple setting and a simple circuit configuration.

Application Example 5

An electronic device according to this application example includes: the real-time clock module according to any one of the application examples explained above; a control device configured to transmit the setting value of the output control information and the setting value of the output value information to the real-time clock module; and a control target device controlled based on the first signal output from the output terminal of the real-time clock module.

With the electronic device according to this application example, the control device can freely control the control target device based on the first signal output from the output terminal of the real-time clock module by setting the setting value of the output control information to the first setting value and setting the output value information to a desired setting value in the real-time clock module via the interface circuit. In this way, according to this application example, the control device is capable of performing the control of the control target device using the real-time clock module that performs a clocking operation. Therefore, for example, it is possible to realize an electronic device with high reliability at lower cost.

Application Example 6

A vehicle according to this application example includes the real-time clock module according to any one of the application examples explained above.

According to this application example, it is possible to perform control of devices using the real-time clock module that performs a clocking operation. Therefore, for example, it is possible to realize a vehicle with high reliability at lower cost.

Application Example 7

An information processing system according to this application example includes: a real-time clock module; and a control device. The real-time clock module includes: a clocking circuit configured to generate clocking data based on a clock signal; an output terminal; a memory circuit configured to store output control information for controlling an output of a signal from the output terminal and output value information in which a value of the signal output from the output terminal is set; and an interface circuit configured to receive a setting value of the output control information and a setting value of the output value information from the control device. When the setting value of the output control information is a first setting value, the real-time clock module outputs a first signal based on the setting value of the output value information from the output terminal. The control device transmits the setting value of the output control information to the real-time clock module.

With the information processing system according to this application example, the control device can freely control a value of the first signal output from the output terminal of the real-time clock module by setting the setting value of the output control information to the first setting value and setting the output value information to a desired setting value in the real-time clock module via the interface circuit. Therefore, the control device can perform control of other devices connected to the output terminal.

Application Example 8

In the information processing system according to the application example, the memory circuit may further store flag information indicating an operation state of the real-time clock module, when the output control information has a second setting value, the real-time clock module may output a second signal based on the flag information from the output terminal, the control device may have a first operation mode and a second operation mode in which power consumption is lower than in the first operation mode, before shifting from the first operation mode to the second operation mode, the control device may transmit the second setting value to the real-time clock module as the setting value of the output control information, and, after shifting from the second operation mode to the first operation mode, the control device may transmit the first setting value to the real-time clock module as the setting value of the output control information.

With information processing system according to this application example, the control device can cause the real-time clock module to output the first signal from the output terminal of the real-time clock module when the control device is in the first operation mode and cause the real-time clock module to output the second signal from the output terminal of the real-time clock module when the control device is in the second operation mode. Therefore, with the information processing system according to this application example, the control device can perform control of other devices based on the first signal when the control device is in the first operation mode and can recognize an operation state of the real-time clock module based on the second signal when the control device is in the second operation mode.

BRIEF DESCRIPTION OF THE DRAWINGS

The invention will be described with reference to the accompanying drawings, wherein like numbers reference like elements.

FIG. 2 is a diagram showing a configuration example of an output setting register.

DESCRIPTION OF EXEMPLARY EMBODIMENTS

A preferred embodiment of the invention is explained in detail below with reference to the drawings. Note that the embodiment explained below does not unduly limit the content of the invention described in the appended claims. Not all of components explained below are essential constituent elements of the invention.

1. Real-Time Clock Module

Figure 1:
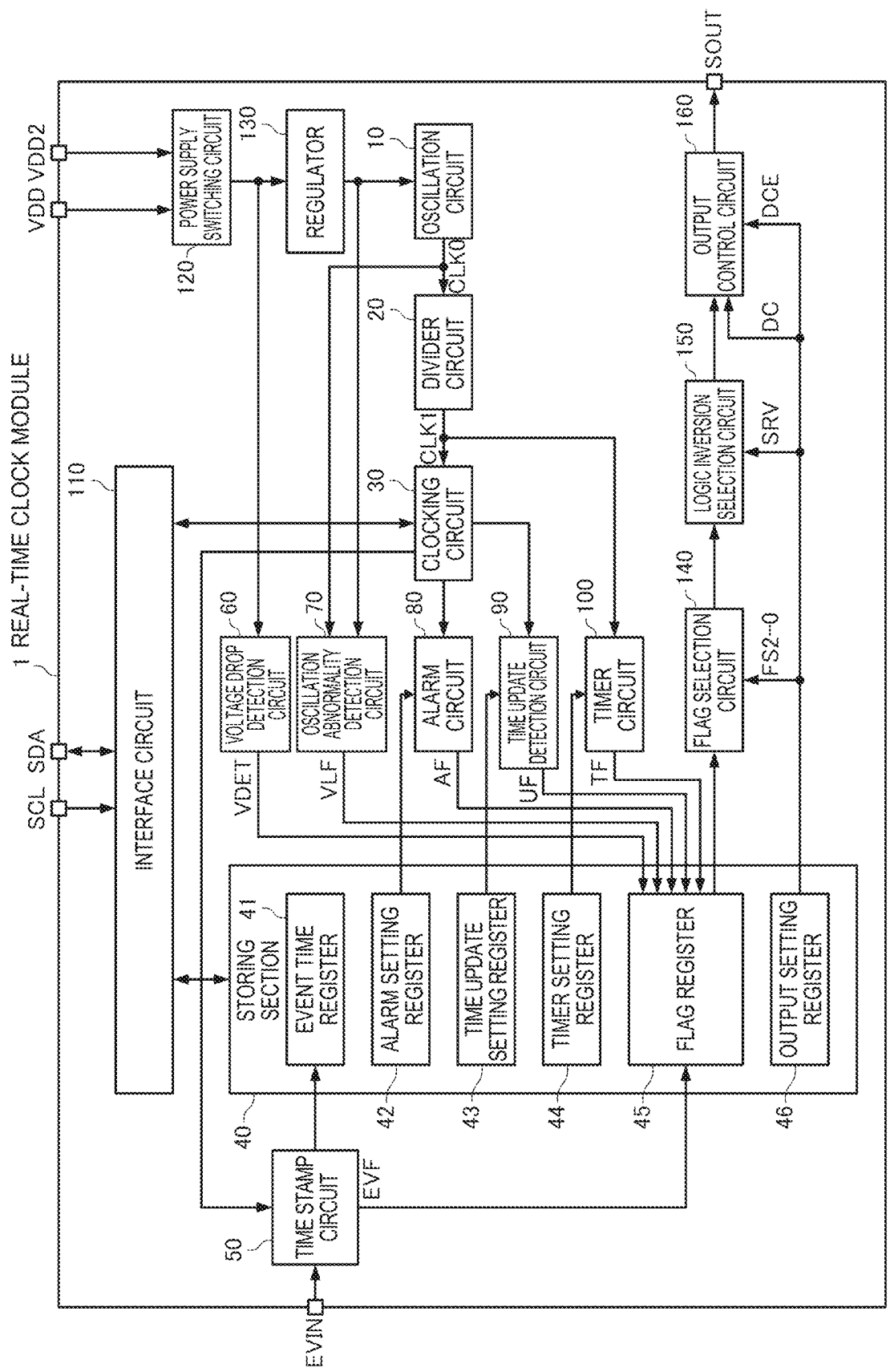
FIG. 1 is a functional block diagram of a real-time clock module in an embodiment.

FIG. 1 is a functional block diagram of a real-time clock module 1 in this embodiment. As shown in FIG. 1, a real-time clock module 1 includes an oscillation circuit 10, a divider circuit 20, a clocking circuit 30, a memory circuit 40, a time stamp circuit 50, a voltage drop detection circuit 60, an oscillation abnormality detection circuit 70, an alarm circuit 80, a time update detection circuit 90, a timer circuit 100, an interface circuit 110, a power supply switching circuit 120, a regulator 130, a flag selection circuit 140, a logic inversion selection circuit 150, and an output control circuit 160. However, in the real-time clock module 1, a part of the components may be omitted or changed or other components may be added.

When a power supply voltage equal to or larger than a predetermined voltage value is supplied from a power supply terminal VDD as a power supply voltage (an operation voltage) for the sections of the real-time clock module 1, the power supply switching circuit 120 outputs the power supply voltage. When the power supply voltage becomes smaller than the predetermined voltage value, the power supply switching circuit 120 performs switching to output a power supply voltage supplied from a power supply terminal VDD2. The power supply voltage output by the power supply switching circuit 120 is supplied to the sections of the real-time clock module 1, and the sections operate. That is, with the power supply switching circuit 120, the real-time clock module 1 can continue a clocking operation with the power supply voltage supplied from the power supply terminal VDD2 even in a state in which a desired power supply voltage is not supplied from the power supply terminal VDD.

The regulator 130 generates, from the power supply voltage output by the power supply switching circuit 120, a constant voltage obtained by stabilizing the predetermined voltage value. The constant voltage generated by the regulator 130 is supplied to the oscillation circuit 10 as a power supply voltage.

The oscillation circuit 10 performs an oscillation operation using, as the power supply voltage, the constant voltage supplied from the regulator 130 to thereby generate a clock signal CLK0.

For example, the oscillation circuit 10 includes a resonator and an amplifier circuit that amplifies an output signal of the resonator and feeds back the output signal to the resonator. The oscillation circuit 10 may be a quartz crystal oscillation circuit including, as the resonator, a tuning fork-type quartz crystal resonator, an AT cut quartz crystal resonator, or an SC cut quartz crystal resonator or may be an oscillation circuit including, as the resonator, an SAW (Surface Acoustic Wave) resonator or a piezoelectric resonator other than a quart crystal resonator. The oscillation circuit 10 may be an oscillation circuit including, as the resonator, a MEMS (Micro Electro Mechanical Systems) resonator made of a silico semiconductor. The resonator may be excited by a piezoelectric effect or may be driven by a Coulomb force (an electrostatic force).

The clock signal CLK0 output from the oscillation circuit 10 is supplied to the divider circuit 20. However, in the real-time clock module 1, the oscillation circuit 10 may be omitted to supply the clock signal CLK0 to the divider circuit 20 from the outside. The divider circuit 20 divides the clock signal CLK0 to thereby generate a clock signal CLK1 having a desired frequency. In the divider circuit 20, a division ratio may be set to N-th power of 2. N T-type flip-flops may be connected in series.

The clock signal CLK1 is supplied to the clocking circuit 30 and supplied to the timer circuit 100. The clocking circuit 30 performs a clocking operation based on the clock signal CLK1 to thereby generate, for example, clocking data ranging from clocking data representing time in second units to clocking data representing time in year units. For example, the frequency of the clock signal CLK1 may be 1 Hz. The clocking circuit 30 may output a carry signal every time the clocking circuit 30 counts the number of pulses of the clock signal CLK1 sixty times and generate, based on a count value of a counter (a second counter) to be reset, clocking data representing time in second units. The clocking circuit 30 may output a carry signal every time the clocking circuit 30 counts the number of carry signals from the second counter sixty times and generate, based on a count value of a counter (a minute counter) to be reset, clocking data representing time in minute units. Concerning each of time data in hour units, day units, day-of-week units, month units, and year units, the clocking circuit 30 may output a carry signal to a post stage every time the clocking circuit 30 counts a predetermined number of carry signals from a pre-stage and generate, based on a count value of a counter to be reset, clocking data representing time in the units. Note that the clocking circuit 30 may generate time data in units of 1 second or less (e.g., 1/100 second units or 1/1000 second units). In this case, the frequency of the clock signal CLK1 only has to be set to a frequency (e.g., 4096 Hz) higher than 1 Hz.

The clocking circuit 30 may include a temperature compensation circuit that compensates for a frequency-temperature characteristic of the oscillation circuit 10 in order to realize highly accurate clocking.

The memory circuit 40 includes, for example, a register group including an event time register 41, an alarm setting register 42, a time update setting register 43, a timer setting register 44, a flag register 45, and an output setting register 46 and a nonvolatile memory (not shown in FIG. 1) that stores various data for control such as frequency adjustment data of the oscillation circuit 10. The data stored in the nonvolatile memory are transferred from the nonvolatile memory to the registers and retained in the registers when the real-time clock module 1 is started. The sections of the real-time clock module 1 are controlled according to the data retained in the registers. The nonvolatile memory may be various rewritable nonvolatile memories such as an EEPROM (Electrically Erasable Programmable Read-Only Memory) and a flash memory or may be various unrewritable nonvolatile memories such as a one time PROM (One Time Programmable Read Only Memory).

The interface circuit 110 is an interface circuit for communication between the real-time clock module 1 and an external device (not shown in FIG. 1). The interface circuit 110 receives various commands from the external device and performs, according to the received commands, writing and readout of various data in and from the memory circuit 40, readout of clocking data from the clocking circuit 30, and the like. In this embodiment, the interface circuit 110 is an interface circuit adapted to an I²C (Inter-Integrated Circuit) bus. A serial clock signal is input to an input terminal SCL from the external device. Serial data is input to and output from the external device via an input and output terminal SDA. However, the interface circuit 110 may be an interface circuit adapted to various serial buses other than the I²C bus such as an SPI (Serial Peripheral Interface) or may be an interface circuit adapted to a parallel bus.

In this embodiment, when receiving a clocking data readout command in which addresses are designated, according to the addresses designated in the received command, the interface circuit 110 acquires at least a part of the clocking data ranging from the clocking data representing time in second units to the clocking data representing time in year units generated by the clocking circuit 30 and transmits the part of the clocking data to the external device. When receiving a register writing command in which addresses and setting values are designated, the interface circuit 110 writes the designated setting values in the registers (the alarm setting register 42, the time update setting register 43, the timer setting register 44, the output setting register 46, etc.) to which the addresses designated in the received command are allocated. When receiving a register readout command in which addresses are designated, the interface circuit 110 reads out stored values from the registers (the event time register 41, the flag register 45, etc.) to which the addresses designated in the received command are allocated.

In response to an event detection signal supplied to an input terminal EVIN from an event detection device (not shown in FIG. 1) present on the outside of the real-time clock module 1, the time stamp circuit 50 stores, in the event time register 41, necessary clocking data among the clocking data generated by the locking circuit 30. Consequently, the real-time clock module 1 can record time when an event is detected by the event detection device. When the event detection signal is supplied to the input terminal EVIN, the time stamp circuit 50 sets a predetermined bit (a flag bit EVF) of the flag register 45 to active (e.g., a high level). That is, the flag bit EVF being active (the high level) indicates that the event is detected by the event detection device.

The voltage drop detection circuit 60 detects a drop of the power supply voltage output by the power supply switching circuit 120 and sets a predetermined bit (a flag bit VDET) of the flag register 45 to active (e.g., a high level). For example, the voltage drop detection circuit 60 may detect the drop of the power supply voltage when the power supply voltage output by the power supply switching circuit 120 is smaller than a predetermined voltage value. The predetermined voltage value is, for example, higher than a lower limit value of an operation guarantee voltage of the real-time clock module 1 and equal to or smaller than a lower limit value of a voltage that guarantees that highly accurate clocking by the clocking circuit 30 is maintained (e.g., a lower limit value of an operation guarantee voltage of the temperature compensation circuit). That is, the flag bit VDET being active (the high level) indicates that reliability of clocking data is slightly low.

The oscillation abnormality detection circuit 70 detects a drop of the constant voltage output by the regulator 130 (the power supply voltage of the oscillation circuit 10) and a stop of the oscillation of the oscillation circuit 10 and sets a predetermined bit (a flag bit VLF) of the flag register 45 to active (e.g., a high level). For example, the oscillation abnormality detection circuit 70 may detect the drop of the power supply voltage when the constant voltage output by the regulator 130 is smaller than a predetermined voltage value. The oscillation abnormality detection circuit 70 may detect the stop of the oscillation when the number of pulses of the clock signal CLK0 in a predetermined time is zero. The predetermined voltage value is, for example, a lower limit value of the operation guarantee voltage of the oscillation circuit 10. That is, the flag bit VLF being active (the high level) indicates that reliability of clocking data is extremely low (the clocking data is unusable).

The alarm circuit 80 detects coincidence of the clocking data of the clocking circuit 30 with clocking data set in the alarm setting register 42 and sets a predetermined bit (a flag bit AF) of the flag register 45 to active (e.g., a high level). That is, the alarm circuit 80 sets the flag bit AF to active (the high level) at time based on setting of the alarm setting register 42.

The time update detection circuit 90 detects timing when clocking data designated by the time update setting register 43 is updated and sets a predetermined bit (a flag bit UF) of the flag register 45 to active (e.g., a high level). For example, the clocking data designated by the time update setting register 43 may be clocking data representing time in second units or may be clocking data representing time in minute units. In the former case, the time update detection circuit 90 sets the flag bit UF to active (the high level) at every one second. In the latter case, the time update detection circuit 90 sets the flag bit UF to active (the high level) at every one minute.

The timer circuit 100 sets, based on the clocking data of the clocking circuit 30, a predetermined bit (a flag bit TF) of the flag register 45 to active (e.g., a high level) every time a time set in the timer setting register 44 elapses. That is, the timer circuit 100 repeatedly sets the flag bit TF to active (the high level) at a predetermined cycle based on the setting of the timer setting register 44.

The flag selection circuit 140 selects one flag bit out of various flag bits stored in the flag register 45 and outputs a value (a low level or a high level) of the selected flag bit.

The logic inverse selection circuit 150 outputs an output signal of the flag selection circuit 140 without logically inverting the output signal or logically inverts and outputs the output signal.

The output control circuit 160 outputs the output signal of the logic inversion selection signal 150 or a preset value.

In this embodiment, the flag selection circuit 140, the logic inversion selection circuit 150, and the output control circuit 160 operate according to the setting values of the output setting register 46.

FIG. 2 is a diagram showing a configuration example of the output setting register 46. As shown in FIG. 2, the output setting register 46 is an 8-bit (substantially, 6-bit) register. A bit 7 (a most significant bit) is a DCE bit and a bit 6 is a DC bit. A bit 5 and a bit 4 are unused bits. A bit 3 is an SRV bit. A bit 2, a bit 1, and a bit 0 are respectively an FS2 bit, an FS1 bit, and an FS0 bit.

The flag selection circuit 140 selects and outputs the flag bit TF of the flag register 45 when all of the FS2 bit, the FS1 bit, and the FS0 bit are 0 (the low level). The flag selection circuit 140 selects and outputs the flag bit AF of the flag register 45 when the FS2 and FS1 bits are 0 and the FS0 bit is 1 (the high level). The flag selection circuit 140 selects and outputs the flag bit UF of the flag register 45 when the FS2 and FS0 bits are 0 and the FS1 bit is 1. The flag selection circuit 140 selects and outputs the flag bit EVF of the flag register 45 when the FS2 bit is 0 and the FS1 bit and the FS0 bit are 1. The flag selection circuit 140 selects and outputs the flag bit VDET of the flag register 45 when the FS2 bit is 1 and the FS1 bit and the FS0 bit are 0. The flag selection circuit 140 selects and outputs the flag bit VLF of the flag register 45 when the FS2 and FS0 bits are 1 and the FS1 bit is 0. The flag selection circuit 140 does not select any flag bit and outputs a low level when the FS2 and FS1 bits are 1.

The logic inversion selection circuit 150 is a circuit that selects based on a setting value of the SRV bit whether a value of a flag bit selected by the flag selection circuit 140 from the various flag bits (which are respectively examples of the "flag information") of the flag register 45 is logically inverted. Specifically, the logic inversion selection circuit 150 outputs an output signal of the flag selection circuit 140 without logically inverting the output signal when the SRV bit is 0. The logic inversion selection circuit 150 logically inverts and outputs the output signal of the flag selection circuit 140 when the SRV bit is 1.

The output control circuit 160 outputs the output signal of the logic inversion selection circuit 150 when the DCE bit is 0 and selects and outputs the DC bit when the DCE bit (an example of the "output control information") is 1. That is, the DCE bit is information for controlling an output of a signal from an output terminal SOUT. The DC bit (an example of the "output value information") is information in which a value of the signal output from the output terminal SOUT is set. The output signal of the output control circuit 160 is output to the outside of the real-time clock module 1 via the output terminal SOUT.

Figure 3:
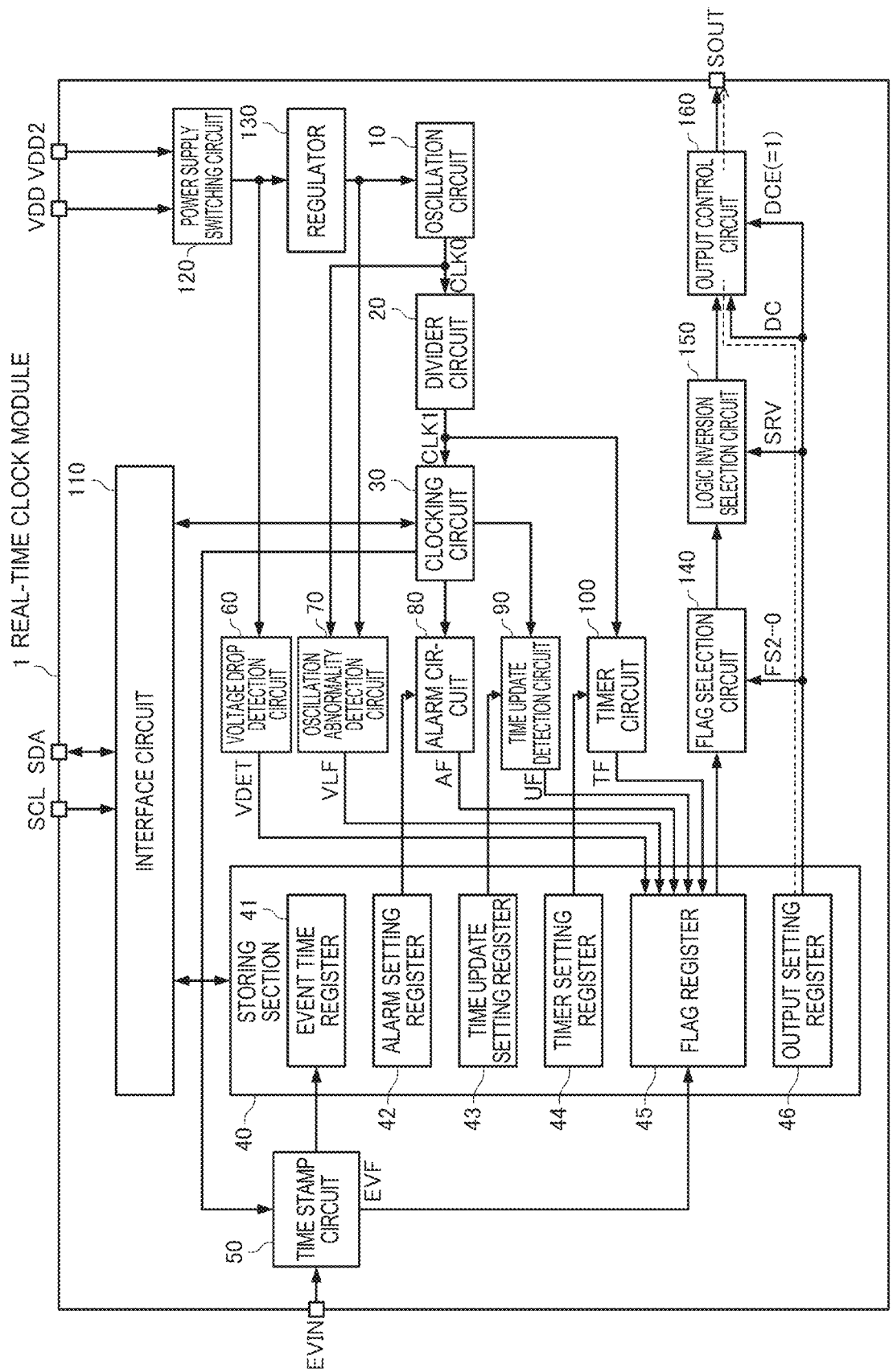
FIG. 3 is a diagram showing a path in which a signal output from an output terminal when a setting value of a DCE bit is 1 is propagated.

In this way, the real-time clock module 1 in this embodiment outputs a low-level or high-level signal (an example of the "first signal") based on the setting value "0" or "1" of the DC bit from the output terminal SOUT when the setting value of the DCE bit is 1 (an example of the "first setting value). In FIG. 3, a path in which a signal output from the output terminal SOUT when the setting value of the DCE bit is 1 is propagated is indicated by a broken line. Therefore, the external device is capable of freely controlling the signal output from the output terminal SOUT to the low level or the high level by setting the DCE bit to 1 and setting the DC bit to 0 or 1 via the interface circuit 110.

Figure 4:
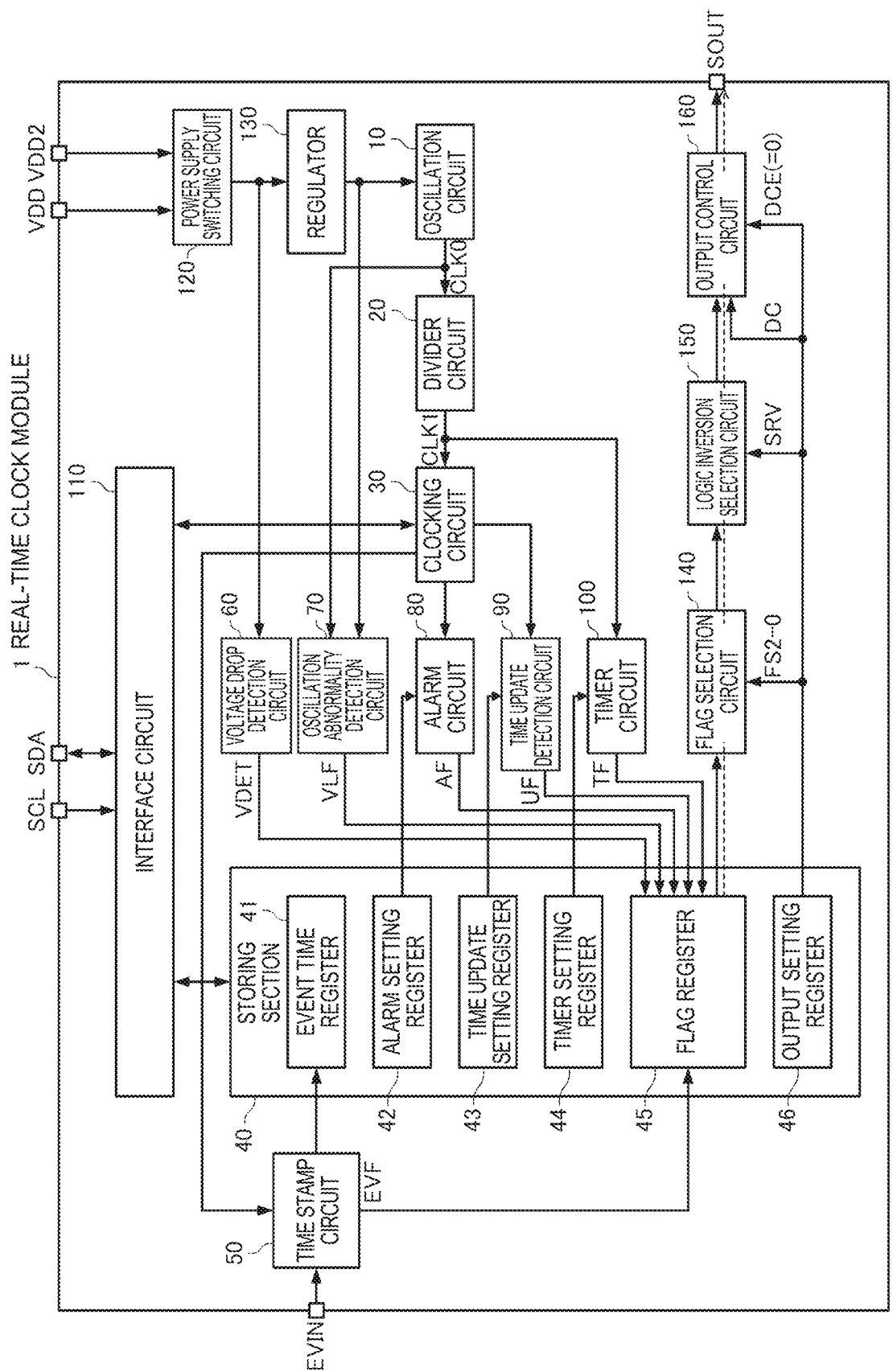
FIG. 4 is a diagram showing a path in which a signal output from the output terminal when the setting value of the DCE bit is 0 is propagated.

The real-time clock module 1 outputs a signal based the various flag bits of the flag register 45 (a low-level or high-level signal based on a value of a flag bit selected according to the FS2 bit, the FS1 bit, and the FS0 bit) (an example of the "second signal") from the output terminal SOUT when the setting value of the DCE bit is 0 (an example of the "second setting value"). In FIG. 4, a path in which a signal output from the output terminal SOUT when the setting value of the DCE bit is 0 is propagated is indicated by a broken line. At this time, a low-level or high-level signal corresponding to a value 0 or 1 of the selected flag bit is output to the output terminal SOUT without being logically inverted or is logically inverted and output to the outer terminal SOUT according to the setting value of the SRV bit. In other words, the SRV bit (an example of the "output logic selection information") is information for selecting whether a signal output from the output terminal SOUT is in a high level or a low level when the value of the selected flag bit is 1 (an example of the "predetermined value"), that is, the flag bit is active.

The flag bits EVF, VDET, VLF, AF, UF, and TF are flag information indicating operation states of the real-time clock module 1. Therefore, the external device can cause the real-time clock module 1 to output a desired flag bit from the output terminal SOUT and can recognize an operation state of the real-time clock module 1 by setting the DCE bit to 0 and setting the FS2 bit, the FS1 bit, and the FS0 bit to desired values via the interface circuit 110. In particular, the flag bits VDET and VLF are flag information indicating abnormal states of the real-time clock module 1. Therefore, if the flag bit VDET or the flag bit VLF is set to be output from the output terminal SOUT, the external device is capable of quickly performing appropriate processing when an abnormality occurs in the real-time clock module 1.

As explained above, the real-time clock module 1 in this embodiment receives the setting value of the DCE bit and the setting value of the DC bit via the interface circuit 110. When the setting value of the DCE bit is 1, the real-time clock module 1 outputs a signal having a logic level based on the setting value of the DC bit from the output terminal SOUT. Therefore, the external device can freely control a value of the signal output from the output terminal SOUT by setting the DCE bit to 1 and setting the DC bit to a desired value in the real-time clock module 1 via the interface circuit 110. Therefore, the external device can perform control of other devices connected to the output terminal SOUT. In this way, the real-time clock module 1 in this embodiment is usable for the control of the devices.

The real-time clock module 1 in this embodiment receives the setting value of the DCE bit and the setting value of the DC bit via the interface circuit 110. When the setting value of the DCE bit is 0, the real-time clock module 1 outputs a signal based on a value of the flag register 45 indicating an operation state of the real-time clock module 1 from the output terminal SOUT. Therefore, the external device can recognize the operation state of the real-time clock module 1 based on the signal output from the output terminal SOUT by setting the DCE bit to 0 in the real-time clock module 1 via the interface circuit 110.

In particular, the real-time clock module 1 in this embodiment receives the setting value of the SRV bit and the setting values of the FS2 bit to the FS0 bit via the interface circuit 110 and outputs, in a polarity selected according to the setting value of the SRV bit, a signal based on a flag bit selected according to the setting values of the FS2 bit to the FS0 bit. Therefore, with the real-time clock module 1 in this embodiment, it is possible to select, with simple setting and a simple circuit configuration, according to the specifications of the external device, a relation between a value of the selected flag bit and a polarity of the signal output from the output terminal SOUT.

2. Information Processing System

Figure 5:
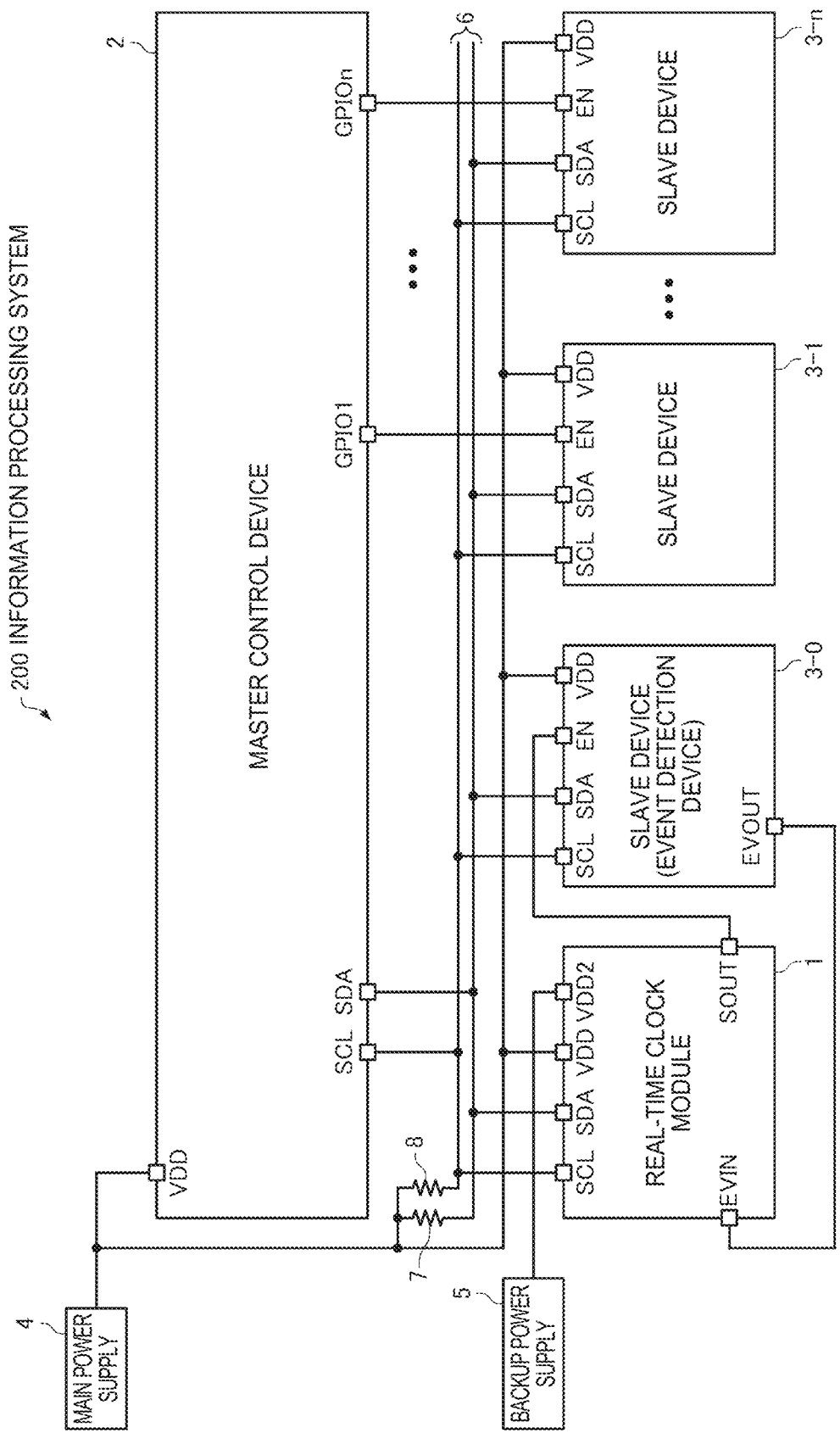
FIG. 5 is a diagram showing a configuration example of an information processing system in the embodiment.

FIG. 5 is a diagram showing a configuration example of an information processing system in this embodiment including the real-time clock module 1 explained above.

In the example shown in FIG. 5, an information processing system 200 includes the real-time clock module 1, a master control device 2 (an example of the "control device"), n+1 slave devices 3-0 to 3-$n$, a main power supply 4, and a backup power supply 5.

The master control device 2 and the slave devices 3-0 to 3-$n$ receive supply of electric power from the main power supply 4 and operate. When the power supply from the main power supply 4 is interrupted, the master control device 2 and the slave devices 3-0 to 3-$n$ stop the operation. On the other hand, the real-time clock module 1 usually receives supply of electric power from the main power supply 4 and performs a clocking operation. When the power supply from the main power supply 4 is interrupted, the clocking operation is switched by the power supply switching circuit 120 (see FIG. 1) to a clocking operation by electric power supplied from the backup power supply 5. That is, the real-time clock module 1 continues the clocking operation while the power supply from the main power supply 4 is interrupted.

The real-time clock module 1, the master control device 2, and the slave devices 3-0 to 3-$n$ are connected to an I²C bus 6 connected to an output signal line (a power supply line) of the main power supply 4 via pullup resistors 7 and 8. However, the real-time clock module 1, the master control device 2, and the slave devices 3-0 to 3-n may be connected to various serial buses other than the I²C bus such as an SPI bus.

The master control device 2 functions as a master and the real-time clock module 1 and the slave devices 3-0 to 3-n function as slaves. Therefore, by transmitting serial clock signals and serial data (various commands), in which slave addresses are designed, to the real-time clock module 1 and the slave devices 3-0 to 3-n, the master control device 2 can write various setting values in and read out various data from devices to which the slave addresses are allocated.

The slave devices 3-0 to 3-n may be devices that perform the same processing or may be devices that perform kinds of processing different from one another. In the example shown in FIG. 5, the slave device 3-0 functions as an event detection device that detects a predetermined event and outputs an event detection signal from an output terminal EVOUT. The predetermined event is an event necessary for information processing by the information processing system 200. The predetermined event may occur, for example, when a stop button of a stopwatch is pressed, when a power meter is operated, or when an electric lock is unlocked. The output terminal EVOUT of the slave device 3-0 (the event detection device) is connected to the input terminal EVIN of the real-time clock module 1. The event detection signal is supplied to the input terminal EVIN of the real-time clock module 1.

In the master control device 2, n general-purpose input and output terminals GPIO1 to GPIOn are respectively connected to enable input terminals EN of the n slave devices 3-1 to 3-n. That is, predetermined functions of the slave devices 3-1 to 3-n are turned on or off according to whether signals output from the general-purpose input and output terminals GPIO1 to GPIOn of the master control device 2 are in a high level or a low level.

In the example shown in FIG. 5, the n general-purpose input and output terminals GPIO1 to GPIOn included in the master control device 2 are respectively connected to the enable input terminals EN of then slave devices 3-1 to 3-n. General-purpose input and output terminals of the master control device 2 connectable to the enable input terminal EN of the slave device 3-0 are insufficient. Therefore, in the example shown in FIG. 5, the output terminal SOUT of the real-time clock module 1 is simulatively used as a general-purpose input and output terminal of the master control device 2. That is, the master control device 2 controls the high level and the low level of the signal output from the output terminal SOUT of the real-time clock module 1, whereby the predetermined function (e.g., an event detecting function) of the slave device 3-0 is turned on and off.

To cause the output terminal SOUT of the real-time clock module 1 to function as the general-purpose input and output terminal, the master control device 2 designates a setting value "1" to the DCE bit and designates a setting value "0" or "1" to the DC bit in the real-time clock module 1 and transmits a register writing command for the output setting register 46 to the real-time clock module 1. The real-time clock module 1 receives the command, sets 1 to the DCE bit of the output setting register 46, and sets 0 or 1 to the DC bit of the output setting register 46. Consequently, in the real-time clock module 1, the signal propagation path shown in FIG. 3 is formed, a low level or high level signal corresponding to the setting value "0" or "1" of the DC bit is output from the output terminal SOUT, and the predetermined function of the slave device 3-0 is turned on or off according to the signal output from the output terminal SOUT.

Note that the output terminal SOUT of the real-time clock module 1 may be connected to a terminal for controlling the operation of the slave device 3-0 other than the enable terminal. Similarly, the general-purpose input and output terminals GPIO1 to GPIOn of the master control device 2 may be respectively connected to terminals for respectively controlling the operations of the slave devices 3-1 to 3-n other than the enable terminals.

In this way, with the information processing system 200 shown in FIG. 5, the master control device 2 can freely control the value of the signal output from the output terminal SOUT of the real-time clock module 1 by setting the DCE bit to 1 and setting the DC bit to a desired value in the real-time clock module 1. Therefore, it is possible to perform control of the slave device 3-0 connected to the output terminal SOUT.

Figure 6:
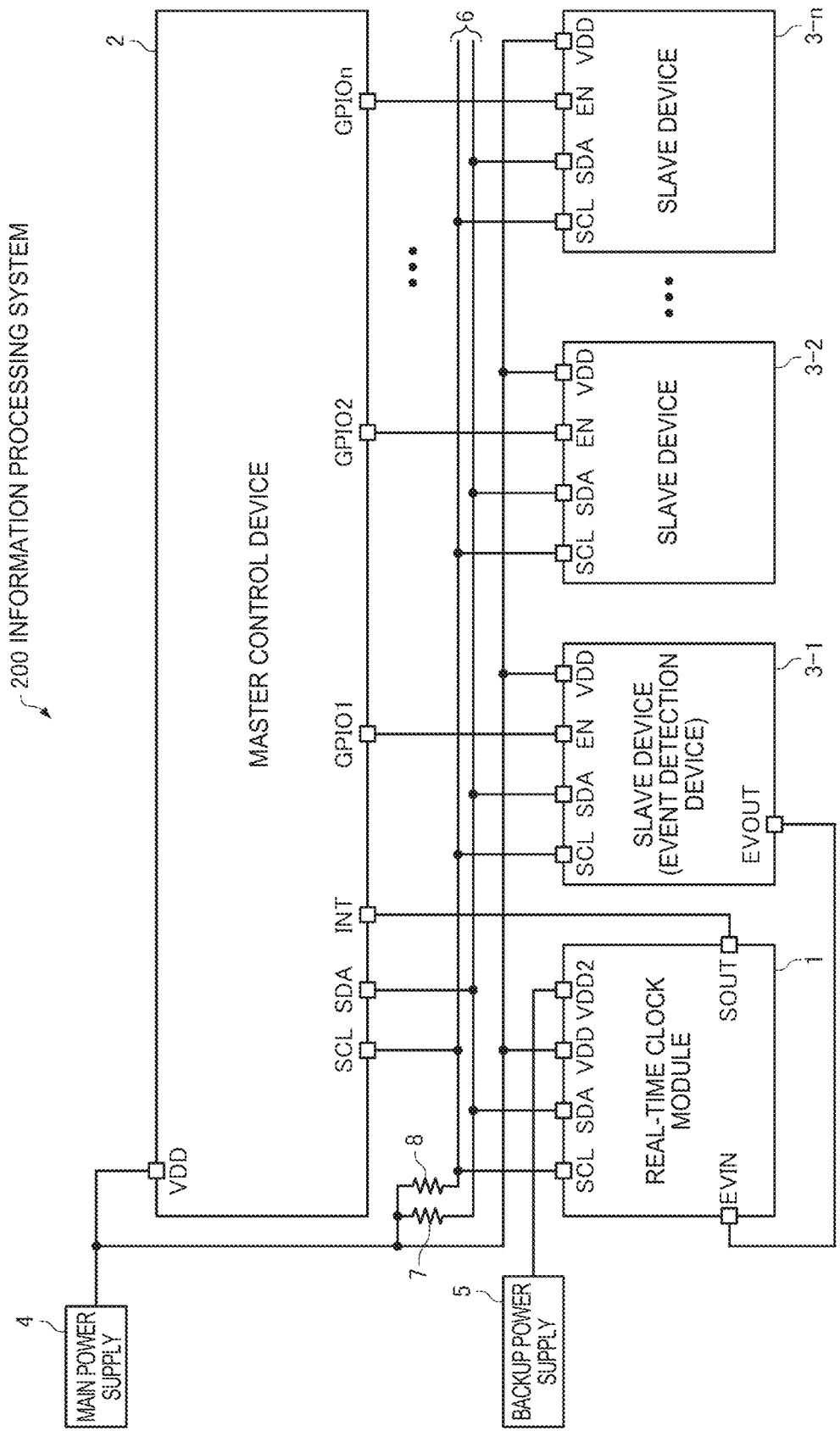
FIG. 6 is a diagram showing another configuration example of the information processing system in the embodiment.

FIG. 6 is a diagram showing another configuration example of the information processing system in this embodiment including the real-time clock module 1 explained above. In FIG. 6, the same components as the components shown in FIG. 5 are denoted by the same reference numerals and signs. Differences from the example shown in FIG. 5 are mainly explained. Redundant explanation is omitted or simplified.

In the example shown in FIG. 6, the information processing system 200 includes the real-time clock module 1, the master control device 2 (an example of the "control device"), the n slave devices 3-1 to 3-n, the main power supply 4, and the backup power supply 5. That is, the number of slave devices is less by one than the example shown in FIG. 5. For example, the slave device 3-1 functions as the event detection device. The output terminal SOUT of the real-time clock module 1 is connected to an interrupt input terminal INT of the master control device 2. The signal output from the output terminal SOUT is used as an interrupt signal.

To cause the output terminal SOUT of the real-time clock module 1 to function as an output terminal of the interrupt signal, the master control device 2 designates a setting value "0" to the DCE bit, designates a setting value "0" or "1" to the SRV bit, and designates any ones of setting values "000" to "101" to the FS2 bit to the FS0 bit in the real-time clock module 1 and transmits a register write command for the output setting register 46 to the real-time clock module 1. The real-time clock module 1 receives the command, sets 0 to the DCE bit of the output setting register 46, sets 0 or 1 to the SRV bit of the output setting register 46, and sets any ones of 000 to 101 to the FS2 bit to the FS0 bit of the output setting register 46. Consequently, in the real-time clock module 1, the signal propagation path shown in FIG. 4 is formed. A low-level or high-level signal corresponding to a value of a flag bit selected according to the setting values of the FS2 bit to the FS0 bit and the setting value of the SRV bit is output from the output terminal SOUT. When requesting an interrupt signal for activating the high level, the master control device 2 only has to designate the setting value "0" (noninversion) to the SRV bit. When requesting an interrupt signal for activating the low level, the master control device 2 only has to designate the setting value "1" (inversion) to the SRV bit. The master control device 2 only has to select a necessary flag bit based on the configuration of the information processing system 200. For example, in the information processing system 200, when the master control device 2 needs to acquire highly accurate clocking data from the real-time clock module 1, the master control device 2 only has to select the flag bit VDET. If a condition that, when the flag bit VLF is 1, the flag bit VDET is also always 1 is satisfied, the master control device 2 can recognize what kind of abnormality occurs by reading out, when the interrupt signal is activated, a value of the flag register 45 of the real-time clock module 1 and acquiring values of the flag bits VDET and VLF. For example, in the information processing system 200, when the master control device 2 or any one of the slave devices 3-1 to 3-n detects a drop of the power supply voltage supplied from the main power supply 4, the master control device 2 only has to select any one of the flag bits EVF, AF, UF, and TF (a flag bit other than the flag bits VDET and VLF).

In this way, with the information processing system 200 shown in FIG. 6, by setting the DCE bit to 0 and setting the SRV bit and the FS2 bit to the FS0 bit to desired values in the real-time clock module 1, the master control device 2 can recognize an operation state of the real-time clock module 1 using, as the interrupt signal, the signal output from the output terminal SOUT of the real-time clock module 1.

Figure 7:
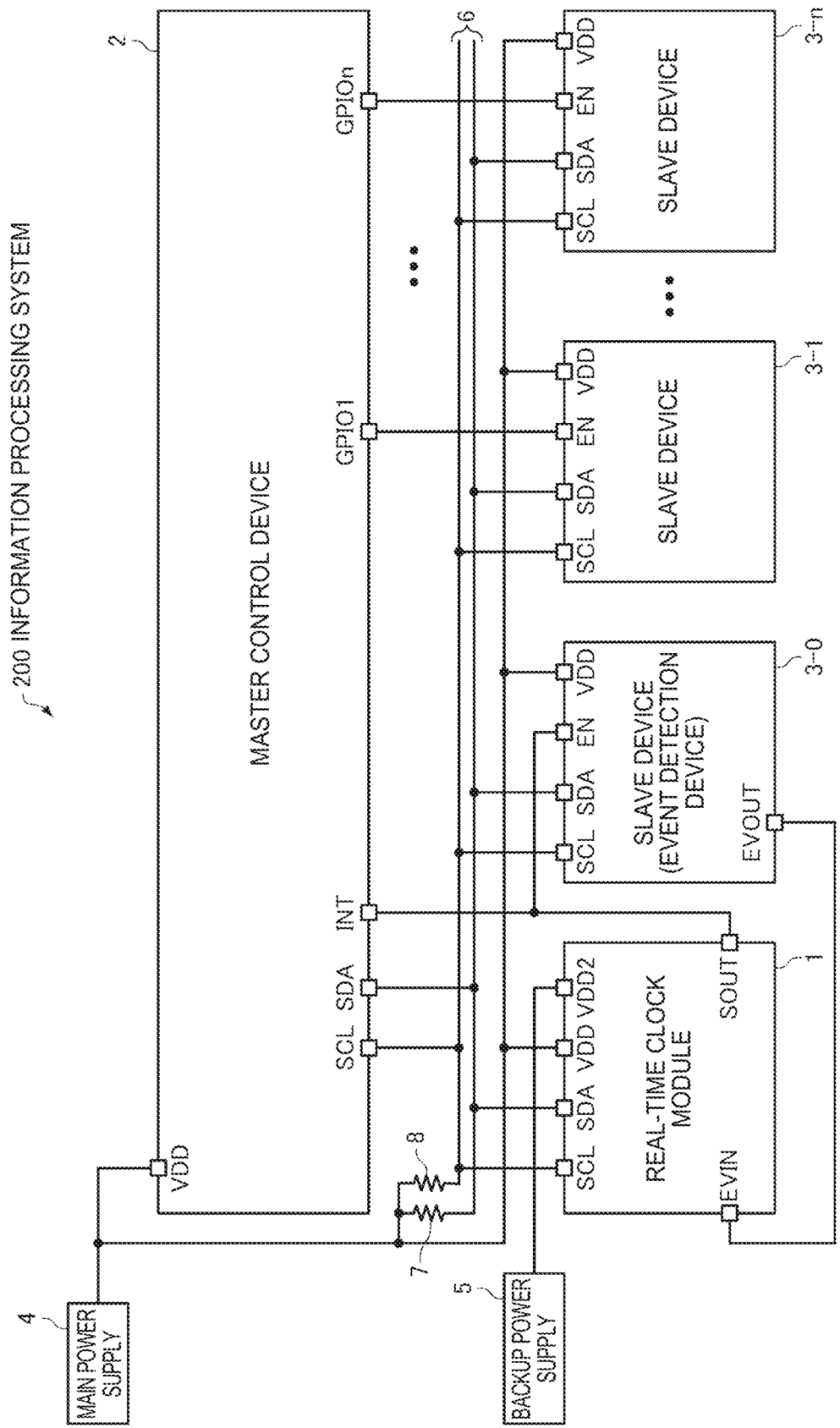
FIG. 7 is a diagram showing another configuration example of the information processing system in the embodiment.

FIG. 7 is a diagram showing another configuration example of the information processing system in this embodiment including the real-time clock module 1. In FIG. 7, the same components as the components shown in FIG. 5 or 6 are denoted by the same reference numerals and signs. Differences from the example shown in FIG. 5 or 6 are mainly explained. Redundant explanation is omitted or simplified.

In the example shown in FIG. 7, as in the example shown in FIG. 5, the information processing system 200 includes the real-time clock module 1, the master control device 2 (an example of the "control device"), the n+1 slave devices 3-0 to 3-n, the main power supply 4, and the backup power supply 5. The master control device 2 has a normal operation mode (an information processing mode) (an example of the "first operation mode") in which an incorporated CPU (not shown in FIG. 7) performs predetermined information processing and a sleep mode (an example of the "second operation mode"). The sleep mode is an operation mode in which only apart of circuits including an interrupt processing circuit (not shown in FIG. 7) incorporated in the master control device 2 operates and the CPU does not perform the predetermined information processing. In the sleep mode, power consumption is lower than power consumption in the normal operation mode (the information processing mode).

The output terminal SOUT of the real-time clock module 1 is connected to the enable input terminal EN of the slave device 3-0 and the interrupt input terminal INT of the maser control device 2. A signal output from the output terminal SOUT is used as an enable signal when the operation mode of the master control device 2 is the normal operation mode (the information processing mode) and is used as an interrupt signal when the operation mode of the master control device 2 is the sleep mode.

To realize such a function, before shifting from the normal operation mode (the information processing mode) to the sleep mode, the master control device 2 sets the setting value "0" to the DCE bit, designates the setting value "0" or "1" to the SRV bit, and designates any ones of the setting values "000" to "101" to the FS2 bit to the FS0 bit in the real-time clock module 1 and transmits a register write command for the output setting register 46 to the real-time clock module 1. The real-time clock module 1 receives the command, sets 0 to the DCE bit of the output setting register 46, sets 0 or 1 to the SRV bit of the output setting register 46, and sets any ones of 000 to 101 to the FS2 bit to the FS0 bit of the output setting register 46. Consequently, when the operation mode of the master control device 2 is the sleep mode, the signal propagation path shown in FIG. 4 is formed in the real-time clock module 1. A low-level or high-level signal corresponding to a value of a flag bit selected according to the setting values of the FS2 bit to the FS0 bit and the setting value of the SRV bit is output from the output terminal SOUT. In the example shown in FIG. 7, as in the example shown in FIG. 6, the master control device 2 only has to select a necessary flag bit based on the configuration of the information processing system 200.

After shifting from the sleep mode to the normal operation mode (the information processing mode), the master control device 2 designates the setting value "1" to the DCE bit and designates the setting value "0" or "1" to the DC bit in the real-time clock module 1 and transmits a register write command for the output setting register 46 to the real-time clock module 1. The real-time clock module 1 receives the command, sets 1 to the DCE bit of the output setting register 46, and sets 0 or 1 to the DC bit of the output setting register 46. Consequently, when the operation mode of the master control device 2 is the normal operation mode (the information processing mode), in the real-time clock module 1, the signal propagation path shown in FIG. 3 is formed, a low-level or high-level signal corresponding to the setting value "0" or "1" of the DC bit is output from the output terminal SOUT, and the predetermined function of the slave device 3-0 is turned on or off according to the signal output from the output terminal SOUT. Note that, in the example shown in FIG. 7, as in the example shown in FIG. 5, the output terminal SOUT of the real-time clock module 1 may be connected to a terminal for controlling the operation of the slave device 3-0 other than the enable terminal.

In this way, with the information processing system 200 shown in FIG. 7, the master control device 2 can freely control a value of the signal output from the output terminal SOUT of the real-time clock module 1 by setting the DCE bit to 1 and setting the DC bit to a desired value in the real-time clock module 1 after shifting to the normal operation mode (the information processing mode). Therefore, the master control device 2 can perform control of the slave device 3-0 connected to the output terminal SOUT.

With the information processing system 200 shown in FIG. 7, the master control device 2 can recognize, after shifting to the sleep mode, an operation state of the real-time clock module 1 using, as an interrupt signal, the signal output from the output terminal SOUT of the real-time clock module 1 by, before shifting to the sleep mode, setting the DCE bit to 0 and setting the SRV bit and the FS2 bit to the FS0 bit to desired values in the real-time clock module 1.

3. Electronic Device

Figure 8:
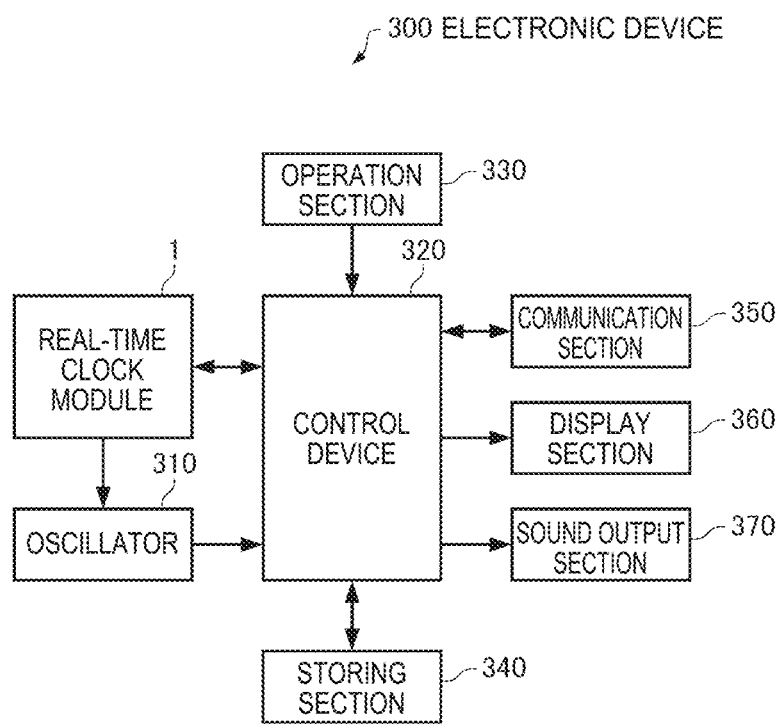
FIG. 8 is a functional block diagram showing an example of the configuration of an electronic device in the embodiment.
Figure 9:
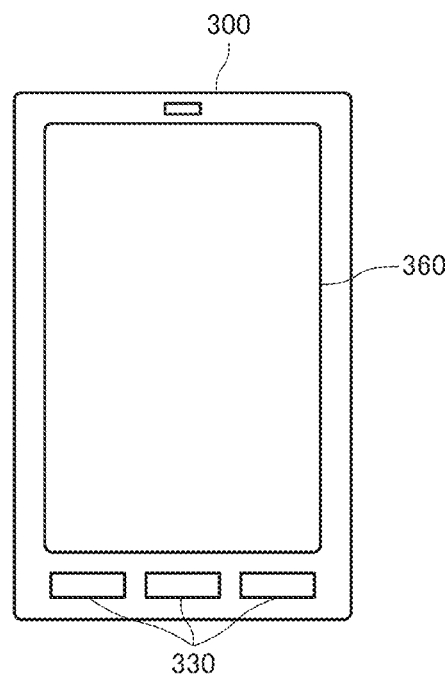
FIG. 9 is a diagram showing an example of the exterior of the electronic device in the embodiment.

FIG. 8 is a functional block diagram showing an example of the configuration of an electronic device in this embodiment including the real-time clock module 1 explained above. FIG. 9 is a diagram showing an example of the exterior of a smartphone, which is an example of the electronic device in this embodiment.

An electronic device 300 in this embodiment includes the real-time clock module 1, an oscillator 310, a control device 320, an operation section 330, a memory circuit 340, a communication section 350, a display section 360, and a sound output section 370. Note that, in the electronic device 300 in this embodiment, a part of the components (the sections) shown in FIG. 8 may be omitted or changed or other components may be added.

The control device 320 operates using, as a clock signal, an oscillation signal output from the oscillator 310 and performs various kinds of calculation processing and control processing according to computer programs stored in the memory circuit 340 and the like. Specifically, the control device 320 performs various kinds of processing corresponding to operation signals from the operation section 330, processing for controlling the communication section 350 in order to perform data communication with other devices, processing for transmitting display signals for causing the display section 360 to display various kinds of information, processing for transmitting sound signals for causing the sound output section 370 to output various sounds, and the like. The control device 320 performs various kinds of setting on the real-time clock module 1 and reads out (receives) clocking data and the like from the real-time clock module 1 and performs various kinds of calculation processing and control processing. The control device 320 is realized by, for example, a MCU (Micro Controller Unit) or a MPU (Micro Processor Unit).

The operation section 330 is an input device including operation keys and button switches. The operation section 330 outputs an operation signal corresponding to operation by a user to the control device 320. The control device 320 can set time information in the real-time clock module 1, for example, according to a signal input from the operation section 330.

The memory circuit 340 has stored therein computer programs, data, and the like for the control device 320 to perform various kinds of calculation processing and control processing. The memory circuit 340 is used as a work area of the control device 320. The memory circuit 340 temporarily stores computer programs and data read out from the memory circuit 340, data input from the operation section 330, results of arithmetic operations executed by the control device 320 according to various computer programs, and the like. The memory circuit 340 includes a ROM (Read Only Memory) and a RAM (Random Access Memory). The memory circuit 340 is realized by, for example, a hard disk, a flexible disk, an MO, an MT, various memories, a CD-ROM, or a DVD-ROM.

The communication section 350 performs various kinds of control for establishing data communication between the control device 320 and the external device.

The display section 360 is a display device including an LCD (Liquid Crystal Display). The display section 360 displays various kinds of information based on display signals input from the control device 320. A touch panel functioning as the operation section 330 may be provided on the display section 360.

The sound output section 370 includes a speaker. The sound output section 370 outputs various kinds of information as sound or voice based on sound signals input from the control device 320.

In the electronic device 300 in this embodiment, the control device 320 transmits a write command for the output setting register 46 (see FIG. 1) to the real-time clock module 1. The real-time clock module 1 receives the command and sets values designated by the command to the bits of the output setting register 46. Consequently, a signal corresponding to a setting value of the DC bit or a signal corresponding to setting values of the FS2 bit to the FS0 bit and the SRV bit is output from the output terminal SOUT (see FIG. 1) of the real-time clock module 1. For example, the signal corresponding to the DC bit output from the output terminal SOUT of the real-time clock module 1 is supplied to the oscillator 310 as a control signal. The oscillator 310 (an example of the "control target device") is controlled based on the control signal. For example, when shifting to the sleep mode, the control device 320 may control the oscillator 310 to stop output of an oscillation signal. When releasing the sleep mode, the control device 320 may control the oscillator 310 to output the oscillation signal.

According to this embodiment, for example, the electronic device 300 including the functions of the information processing system 200 is realized. The electronic device 300 in this embodiment includes the real-time clock module 1. Therefore, it is possible to maintain high reliability at low cost.

Various electronic devices are conceivable as such an electronic device 300. Examples of the electronic device 300 include an electronic timepiece, personal computers (e.g., a mobile personal computer, a laptop personal computer, and a tablet personal computer), mobile terminals such as a smartphone and a cellular phone, a digital camera, an inkjet ejecting device (e.g., an inkjet printer), storage area network devices such as a server (a time server), a router, and a switch, local area network devices, devices for a mobile terminal base station, a television, a video camera, a video recorder, a car navigation device, a real-time clock device, a pager, an electronic notebook (including an electronic notebook with a communication function), an electronic dictionary, an electronic calculator, an electronic game device, a game controller, a word processor, a work station, a videophone, a television monitor for crime prevention, an electronic binocular, a POS terminal, medical instruments (e.g., an electronic thermometer, a manometer, a blood sugar meter, an electrocardiograph device, an ultrasonic diagnosis device, and an electronic endoscope), a fish finder, various measurement devices such as a gas meter, a water meter, and a power meter (a smart meter) having a wired or wireless communication function and capable of transmitting various data, meters (e.g., meters of a vehicle, an airplane, and a ship), a flight simulator, a head mounted display, a motion tracer, a motion tracker, a motion controller, and a PDR (a pedestrian position azimuth meter).

4. Vehicle

Figure 10:
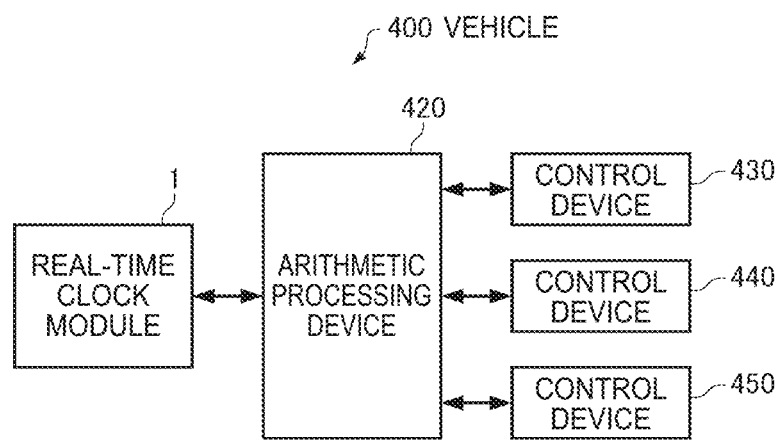
FIG. 10 is a functional block diagram showing an example of the configuration of a vehicle in the embodiment.
Figure 11:
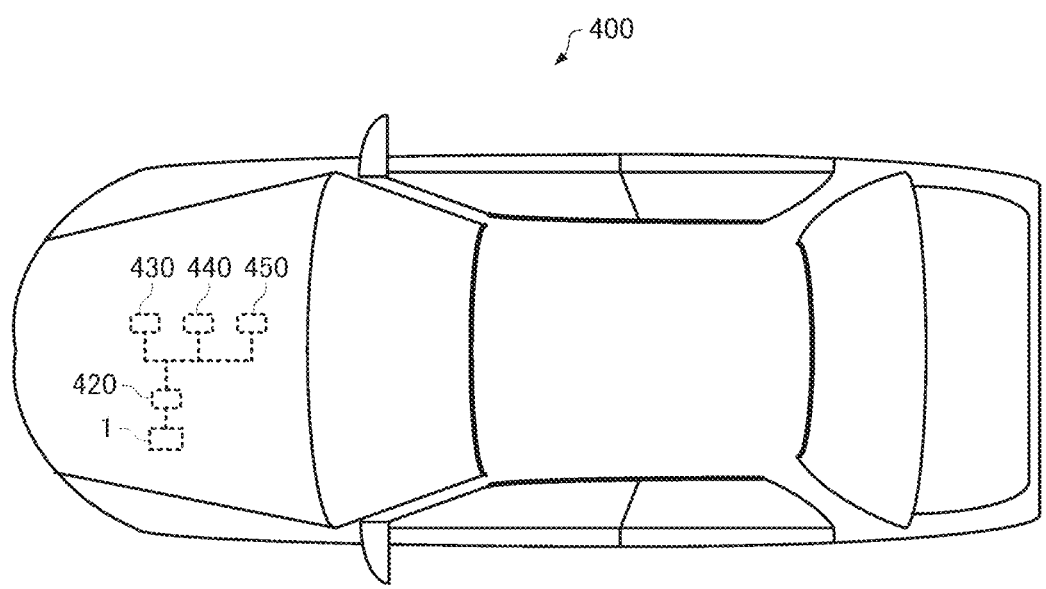
FIG. 11 is a diagram showing an example of the exterior of the vehicle in the embodiment.

FIG. 10 is a functional block diagram showing an example of the configuration of a vehicle in this embodiment including the real-time clock module 1. FIG. 11 is a view (a top view) showing an example of the exterior of an automobile, which is an example of the vehicle in this embodiment. A vehicle 400 in this embodiment includes the real-time clock module 1, an arithmetic processing device 420, and control devices 430, 440, and 450. Note that, in the vehicle in this embodiment, a part of the components (the sections) shown in FIGS. 10 and 11 may be omitted or other components may be added.

The arithmetic processing device 420 performs various kinds of calculation processing and control processing according to computer programs stored in a not-shown memory circuit or the like incorporated in the arithmetic processing device 420. Specifically, the arithmetic processing device 420 performs processing for controlling the control devices 430, 440, and 450. The arithmetic processing device 420 performs various kinds of setting on the real-time clock module 1 and reads out (receives) clocking data and the like from the real-time clock module 1 and performs various kinds of calculation processing and control processing.

The control devices 430, 440, 450 perform, for example, various kinds of control of an engine system, a brake system, a keyless entry system, and the like on the vehicle 400.

In the vehicle 400 in this embodiment, the arithmetic processing device 420 transmits a write command for the output setting register 46 (see FIG. 1) to the real-time clock module 1. The real-time clock module 1 receives the command and sets values designated by the command to the bits of the output setting register 46. Consequently, a signal corresponding to a setting value of the DC bit or a signal corresponding to setting values of the FS2 bit to the FS0 bit and the SRV bit is output from the output terminal SOUT (see FIG. 1) of the real-time clock module 1. For example, the vehicle 400 including the functions of the information processing system 200 explained above is realized. The vehicle 400 in this embodiment includes the real-time clock module 1. Therefore, for example, it is possible to maintain high reliability at low cost.

Various vehicles are conceivable as such a vehicle 400. Examples of the vehicle 400 include an automobile (including an electric automobile), aeroplanes such as a jet plane and a helicopter, a ship, a rocket, and an artificial satellite.

The invention is not limited to this embodiment. Various modified implementations are possible within a range of the gist of the invention.

The embodiments and the modifications explained above are examples. The invention is not limited to the embodiments and the modifications. For example, the embodiments and the modifications can be combined as appropriate.

The invention includes configurations substantially the same as the configurations explained in the embodiment (e.g., configurations having the same functions, methods, and results or configurations having the same purposes and effects). The invention includes configurations obtained by replacing unessential portions of the configurations explained in the embodiment. The invention includes configurations that have the same operational effects as the operational effects of the configurations explained in the embodiment or configurations that can achieve the same object as the object of the embodiment. The invention includes configurations obtained by adding publicly-known techniques to the configurations explained in the embodiment.

The entire disclosure of Japanese Patent Application No. 2017-120381, filed Jun. 20, 2017 is expressly incorporated by reference herein.

What is claimed is:

1. A real-time clock module comprising:
   a clocking circuit configured to generate clocking data based on a clock signal;
   an output terminal;
   a memory circuit configured to store output control information for controlling an output of a signal from the output terminal and output value information in which a value of the signal output from the output terminal is set; and
   an interface circuit configured to receive a setting value of the output control information and a setting value of the output value information, wherein
   when the setting value of the output control information is a first setting value, the real-time clock module outputs a first signal based on the setting value of the output value information from the output terminal.

2. The real-time clock module according to claim 1, wherein
   the memory circuit further stores flag information indicating an operation state of the real-time clock module, and
   when the setting value of the output control information is a second setting value, the real-time clock module outputs a second signal based on the flag information from the output terminal.

3. The real-time clock module according to claim 2, wherein
   the memory circuit further stores output logic selection information for selecting whether the second signal is in a high level or a low level when the flag information has a predetermined value, and
   the interface circuit receives a setting value of the output logic selection information.

4. The real-time clock module according to claim 3, further comprising a logic inversion selection circuit configured to select based on the setting value of the output logic selection information whether a value of the flag information is logically inverted.

5. An electronic device comprising:
   the real-time clock module according to claim 1;
   a control device configured to transmit the setting value of the output control information and the setting value of the output value information to the real-time clock module; and
   a control target device controlled based on the first signal output from the output terminal of the real-time clock module.

6. An electronic device comprising:
   the real-time clock module according to claim 2;
   a control device configured to transmit the setting value of the output control information and the setting value of the output value information to the real-time clock module; and
   a control target device controlled based on the first signal output from the output terminal of the real-time clock module.

7. An electronic device comprising:
   the real-time clock module according to claim 3;
   a control device configured to transmit the setting value of the output control information and the setting value of the output value information to the real-time clock module; and
   a control target device controlled based on the first signal output from the output terminal of the real-time clock module.

8. An electronic device comprising:
   the real-time clock module according to claim 4;
   a control device configured to transmit the setting value of the output control information and the setting value of the output value information to the real-time clock module; and
   a control target device controlled based on the first signal output from the output terminal of the real-time clock module.

9. A vehicle comprising the real-time clock module according to claim 1.

10. An information processing system comprising:
    a real-time clock module; and
    a control device, wherein
    the real-time clock module includes:
    a clocking circuit configured to generate clocking data based on a clock signal;
    an output terminal;
    a memory circuit configured to store output control information for controlling an output of a signal from the output terminal and output value information in which a value of the signal output from the output terminal is set; and
    an interface circuit configured to receive a setting value of the output control information and a setting value of the output value information from the control device, when the setting value of the output control information is a first setting value, the real-time clock module outputs a first signal based on the setting value of the output value information from the output terminal, and the control device transmits the setting value of the output control information to the real-time clock module.

11. The information processing system according to claim 10, wherein the memory circuit further stores flag information indicating an operation state of the real-time clock module, when the output control information has a second setting value, the real-time clock module outputs a second signal based on the flag information from the output terminal, the control device has a first operation mode and a second operation mode in which power consumption is lower than in the first operation mode, before shifting from the first operation mode to the second operation mode, the control device transmits the second setting value to the real-time clock module as the setting value of the output control information, and after shifting from the second operation mode to the first operation mode, the control device transmits the first setting value to the real-time clock module as the setting value of the output control information.

* * * * *